(12) United States Patent
Elfstrom

(10) Patent No.: US 12,185,883 B2
(45) Date of Patent: Jan. 7, 2025

(54) DISPENSER AND DISPENSER MONITORING SYSTEMS AND METHODS

(71) Applicant: Essity Hygiene and Health Aktiebolag

(72) Inventor: Boris Allan Elfstrom, Philadelphia, PA (US)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 61 days.

(21) Appl. No.: 16/325,780

(22) PCT Filed: Sep. 19, 2016

(86) PCT No.: PCT/EP2016/072171
§ 371 (c)(1),
(2) Date: Feb. 15, 2019

(87) PCT Pub. No.: WO2018/050250
PCT Pub. Date: Mar. 22, 2018

(65) Prior Publication Data
US 2019/0246848 A1    Aug. 15, 2019

(51) Int. Cl.
*A47K 5/12* (2006.01)
*G06Q 10/0631* (2023.01)
(Continued)

(52) U.S. Cl.
CPC .......... *A47K 5/1207* (2013.01); *A47K 5/1217* (2013.01); *G06Q 10/0631* (2013.01);
(Continued)

(58) Field of Classification Search
CPC ... G06Q 10/0631; G06Q 10/087; G06Q 10/20
(Continued)

(56) References Cited

U.S. PATENT DOCUMENTS 7,726,599 B2   6/2010  Lewis et al.
9,497,428 B2 * 11/2016 Gaisser ................. G16H 40/20
(Continued)

FOREIGN PATENT DOCUMENTS

CA      2853031 A1   4/2013
CN      1421577 A    6/2003
(Continued)

OTHER PUBLICATIONS

International Searching Authority, Search Report and Written Opinion issued in International Application No. PCT/EP2016/072171 mailed Mar. 1, 2017 (11 pages).
(Continued)

*Primary Examiner* — Florian M Zeender
*Assistant Examiner* — Vanessa Deligi
(74) *Attorney, Agent, or Firm* — CANTOR COLBURN LLP

(57) ABSTRACT

A dispenser for hygiene products includes an electromechanical switch that is configured to operate when a hygiene product is dispensed. The action of dispensing the hygiene product causes the electromechanical switch to convert the mechanical energy associated with the dispensing action into electrical energy. The dispenser is configured to use the electrical energy to emit a signal such that the dispenser emits two signals each time a hygiene product is dispensed. A system for monitoring the consumption of hygiene products in a dispenser includes a dispenser as described above and a receiver for wirelessly receiving the emitted signal, the receiver being positioned remotely from the dispenser, and a central computer or server for receiving data from the receiver. A method of monitoring a dispenser for hygiene products is also provided.

18 Claims, 8 Drawing Sheets

(51) Int. Cl.
*G06Q 10/087* (2023.01)
*G06Q 10/20* (2023.01)
*G08B 21/24* (2006.01)
*H01H 13/18* (2006.01)

(52) U.S. Cl.
CPC .......... *G06Q 10/087* (2013.01); *G06Q 10/20* (2013.01); *G08B 21/245* (2013.01); *H01H 13/18* (2013.01)

(58) Field of Classification Search
USPC ...................................................... 705/28, 22
See application file for complete search history.

(56) References Cited

U.S. PATENT DOCUMENTS

| | | | |
|---|---|---|---|
| 9,913,562 B2* | 3/2018 | Wegelin | A47K 5/1211 |
| 9,922,167 B2* | 3/2018 | Tenarvitz | G07C 9/257 |
| 2003/0030562 A1* | 2/2003 | Lane | G08B 21/245 |
| | | | 340/573.4 |
| 2006/0173576 A1* | 8/2006 | Goerg | A47K 10/3662 |
| | | | 700/236 |
| 2008/0021779 A1* | 1/2008 | Lynn | G06Q 30/02 |
| | | | 705/14.65 |
| 2009/0195385 A1* | 8/2009 | Huang | G16H 40/20 |
| | | | 340/572.1 |
| 2010/0012679 A1* | 1/2010 | Brownlee | A47K 5/1217 |
| | | | 700/282 |
| 2010/0207767 A1* | 8/2010 | Verdiramo | G08B 21/245 |
| | | | 340/573.1 |
| 2011/0046911 A1* | 2/2011 | Studer | G09F 23/06 |
| | | | 702/108 |
| 2012/0234867 A1* | 9/2012 | Ophardt | A47K 5/1217 |
| | | | 429/400 |
| 2013/0099900 A1* | 4/2013 | Pulvermacher | B05B 11/108 |
| | | | 340/10.42 |
| 2014/0097709 A1 | 4/2014 | Ueno et al. | |
| 2014/0224375 A1* | 8/2014 | Willis | B67D 1/16 |
| | | | 141/1 |
| 2015/0235549 A1* | 8/2015 | Limbert | A47K 5/12 |
| | | | 340/573.1 |
| 2020/0013039 A1* | 1/2020 | Snodgrass | G06Q 20/327 |

FOREIGN PATENT DOCUMENTS

| | | | | |
|---|---|---|---|---|
| WO | WO-2011000021 A1 * | 1/2011 | .......... | B67D 1/0462 |
| WO | 2012064515 A2 | 5/2012 | | |

OTHER PUBLICATIONS

International Searching Authority, Written Opinion of the International Preliminary Examining Authority issued in International Application No. PCT/EP2016/072171 mailed Aug. 24, 2018 (4 pages).

International Searching Authority, International Preliminary Report on Patentability issued in International Application No. PCT/EP2016/072171 mailed Dec. 6, 2018 (13 pages).

European Patent Office, Communication pursuant to Article 94(3) EPC, Application No. 16766585.0, mailed Jul. 12, 2021 (5 pages).

Office Action issued in Mexican Patent Application No. MX/a/2019/003109; Application Filing Date Sep. 19, 2016; Date of Mailing Nov. 27, 2023 (5 pages).

Chinese Application No. 202310071533.8; Office Action with English translation dated Aug. 14, 2024; 21 pages.

* cited by examiner

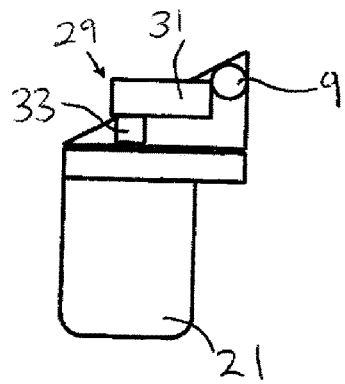
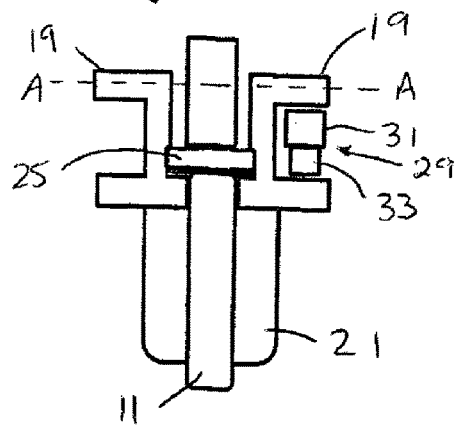
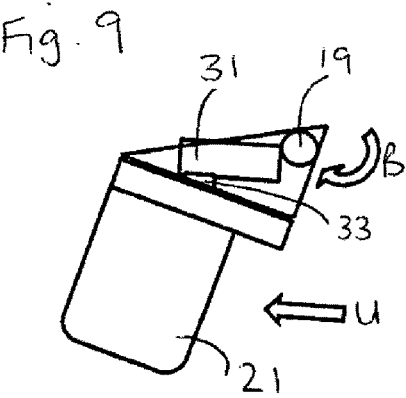
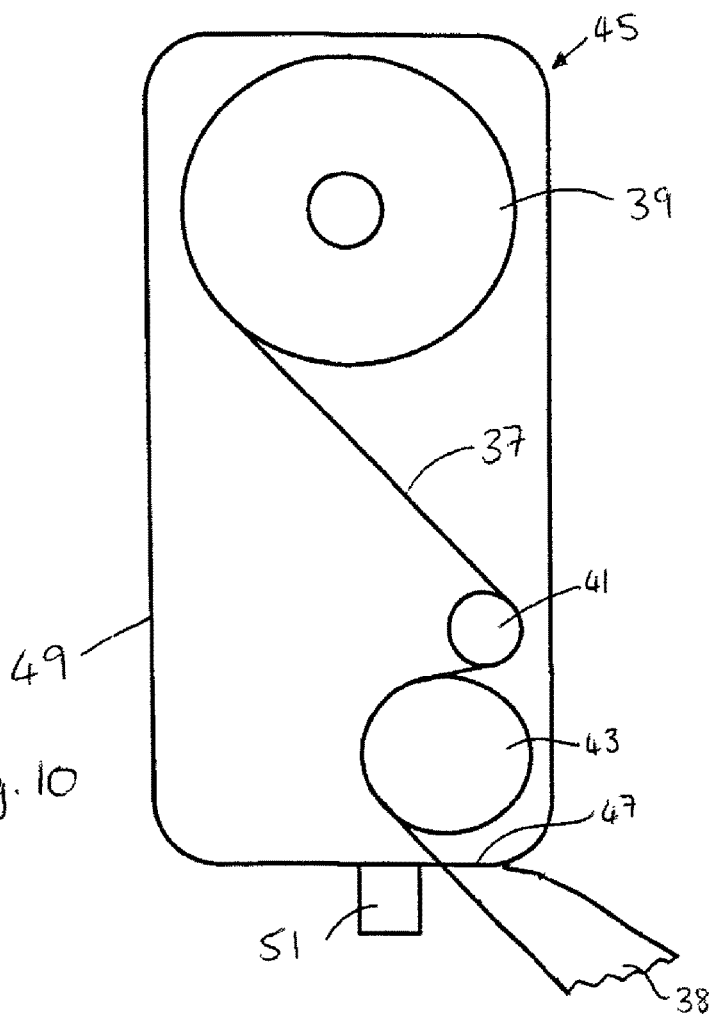

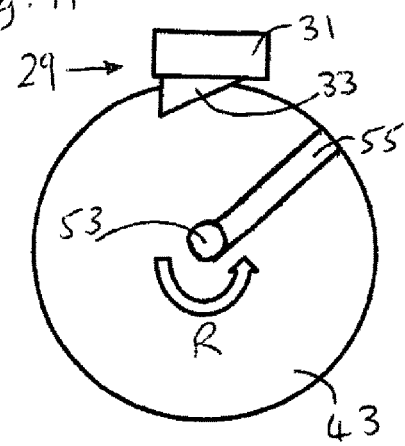
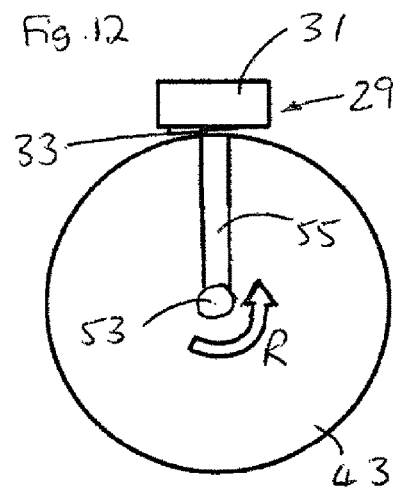
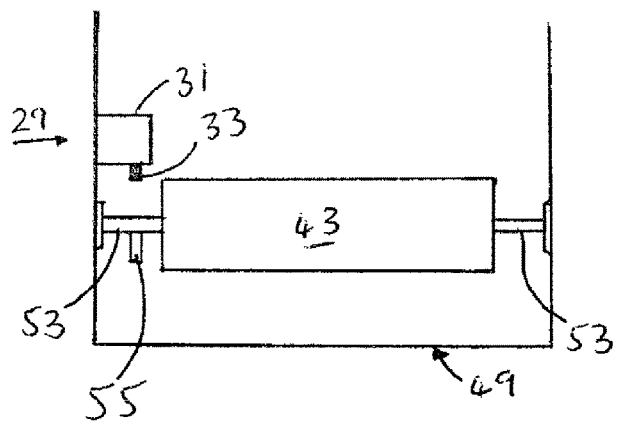
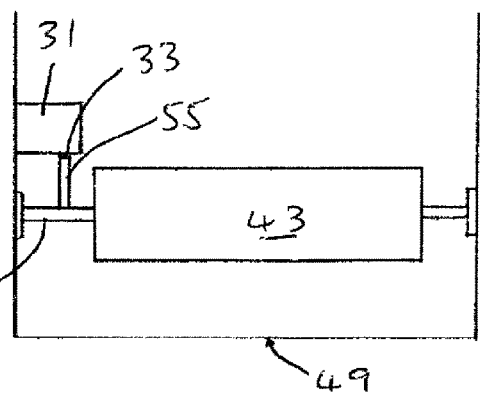
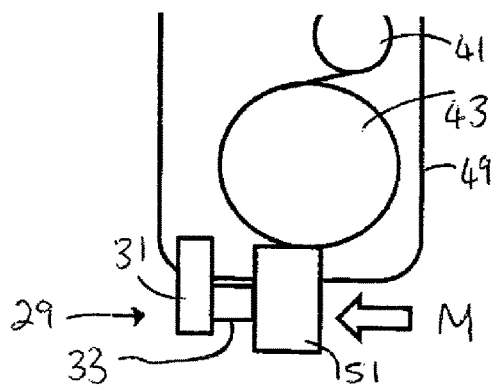
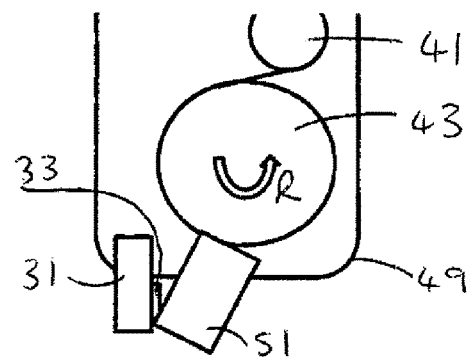

DISPENSER AND DISPENSER MONITORING SYSTEMS AND METHODS

CROSS-REFERENCE TO RELATED APPLICATION

This application is a national stage entry under 35 U.S.C. § 371 of, and claims priority to, International Application No. PCT/EP2016/072171, filed Sep. 19, 2016, with the same title as listed above. The above-mentioned patent application is incorporated herein by reference in its entirety.

TECHNICAL FIELD

The present disclosure relates to dispensers for hygiene products such as washroom products, for example, and also relates to monitoring systems for such dispensers and methods of monitoring such dispensers.

BACKGROUND

Dispensers such as paper towel dispensers, soap dispensers and toilet paper dispensers are commonly found in washrooms in public buildings, offices, schools, hospitals, restaurants, airports, shopping malls, fitness centres, etc. Additionally, other dispensers such as shampoo dispensers, facial tissue dispensers, shower gel dispensers, hand disinfectant dispensers and sanitary towel dispensers may also be found in such washrooms. Generally, a separate dispenser is provided for each type of consumable, and in larger washrooms, several dispensers of the same type may be provided.

The task of checking the level of each consumable and refilling a dispenser when the level of the consumable is low is usually undertaken by cleaning personnel or a janitor. In large buildings having several washrooms with multiple dispensers, the janitor must check each individual dispenser in each washroom to ascertain whether the dispenser needs to be refilled or not. This can take up a considerable amount of time, and a significant amount of time can be wasted by the janitor checking dispensers which do not require refilling. Furthermore, from a management point of view, it can be difficult to know in advance the quantity of consumables which must be ordered and kept in stock. For these reasons, there is a need for dispensers which are configured to monitor the consumption of consumables and to signal to a central service point that, for example, a dispenser needs refilling.

Dispensers have been developed which comprise one or more sensors for detecting the level of the consumable within the dispenser. Generally, such sensors detect when the level of the consumable is below a predetermined threshold value. Such sensors may include an infrared sensor which detects when the height of a paper stack, such as a stack of paper towels in a dispenser, falls below a specified threshold. This threshold corresponds to a condition in which the dispenser needs refilling.

Other types of sensors can, for example, include a light emitting diode and a photodetector which together can be used for detecting the level of a consumable within a dispenser.

It is furthermore known that a sensor associated with a dispenser can be connected to a central service office, for example to a central computer server, so that the server is notified when that dispenser needs refilling. A janitor can then be informed by the central computer server or by an operator that the dispenser needs refilling.

The sensors may be connected to the main electricity supply or may alternatively be powered by one or more batteries. Where the sensors are powered by one or more batteries, extra maintenance will need to be undertaken to replace the battery or batteries when necessary.

It would be desirable to provide a dispenser that is able to communicate information relating to the consumption of consumables whilst exhibiting improved reliability and requiring less maintenance relative to conventional dispensers.

It would also be desirable to provide a monitoring system for such a dispenser and a method of monitoring such a dispenser.

SUMMARY

According to the present disclosure there is provided in one embodiment a dispenser for hygiene products comprising an electromechanical switch which is configured to operate when a hygiene product is dispensed, wherein the action of dispensing the hygiene product causes the electromechanical switch to convert the mechanical energy associated with the dispensing action into electrical energy, the dispenser being configured to use that electrical energy to emit a signal each time a hygiene product is dispensed.

In one aspect, the electromechanical switch may comprise a coil and a magnet. When the consumable is dispensed, the mechanical action of dispensing causes the magnet to be physically moved relative to the coil to thereby generate an electric current, the electromechanical switch thereby converting the mechanical energy associated with the dispensing action into electrical energy. This electrical energy is in turn used by the dispenser to emit and transmit a signal. The dispenser may comprise a circuit board and antenna for generating and emitting the signal. The signal may be a radio frequency ("RF") signal. The frequency of the signal may be an open frequency, and may be, for example, 868 MHz, 915 MHz or 2.4 GHz.

The dispenser therefore may not need to be connected to the main electricity to emit a signal and may not require power from a power source such as a battery for emitting such signal, as it is capable of generating its own electricity when a consumable is dispensed. This permits the dispenser to be monitored using a wireless system even where operation of the dispenser does not require electricity. As neither the electromechanical switch nor the rest of the dispenser requires a battery in particular embodiments, the need for maintenance associated with recharging or replacing a battery is thereby obviated.

In another aspect of the present disclosure, there is provided a system for monitoring the consumption of hygiene products in a dispenser, the system comprising: at least one dispenser having an electromechanical switch which is configured to operate when a hygiene product is dispensed, wherein the action of dispensing the hygiene product causes the electromechanical switch to convert the mechanical energy associated with the dispensing action into electrical energy, the dispenser being configured to use that electrical energy to emit a signal each time a hygiene product is dispensed; a receiver for wirelessly receiving the emitted signal, the receiver being positioned remotely from the dispenser; and a central computer or server for receiving data from the receiver.

In another embodiment, a plurality of dispensers may be provided, each dispenser comprising an electromechanical switch and a signal emitter. The dispensers may be of the same type, e.g. paper towel dispensers, or may be of different types, e.g. a paper towel dispenser and a soap dispenser. Each dispenser has a signal emitter configured to emit a uniquely identifiable radio frequency signal so that the emitter, and therefore the associated dispenser, may be identified. A single receiver may be provided for wirelessly receiving the emitted signals from each of the dispensers.

Where several washrooms are to be monitored, each of the washrooms may include one or more dispensers, and each of the washrooms may have its own receiver for receiving signals emitted by each of the dispensers in that washroom.

The central computer or server may be associated with a storage medium for storing and/or monitoring data received from the receiver. The receiver may be configured to send data to the central computer or server only upon fulfillment of one or more predetermined conditions. For example, the receiver may be configured to send data to the central computer or server only at certain times of the day. Additionally, or alternatively, the receiver may be configured to send data to the central computer or server only when the dispenser has been used to dispense hygiene products a predetermined number of times. This predetermined number may correspond, for example, to the number of times the dispenser may be used before the level of consumables in the dispenser becomes critically low. The predetermined number may be set in accordance with the consumable, so, for example, a predetermined number may be set for a 200 m roll towel and a different predetermined number may be set for a 300 m roll towel.

In this manner, the receiver may be configured to minimize the amount of data transmitted to the central computer or server. This may be desirable where a plurality of electromechanical switches and emitters is provided in a washroom, especially where the building includes several washrooms to be monitored. By ensuring that the receiver is configured to transmit data to the central computer or server only upon the fulfillment of one or more predetermined conditions, the amount of data transmitted can be minimized. This, in turn, reduces the risk of errors that may occur during data transmission, thereby reducing the costs associated with the transmission of the data and also reducing the computer infrastructure and data storage required.

In another embodiment of the present disclosure, there is provided a method of monitoring a dispenser for hygiene products, the method including: providing a dispenser that has an electromechanical switch that operates when a hygiene product is dispensed, the action of dispensing the hygiene product causing the electromechanical switch to convert the mechanical energy associated with the dispensing action into electrical energy, the dispenser further being provided with an emitter that uses that electrical energy to emit a signal each time a hygiene product is dispensed; and providing a receiver which wirelessly receives the emitted signal, the receiver being positioned remotely from the dispenser and the receiver transmitting data related to the dispenser to a central computer or server.

In one aspect, a plurality of dispensers is provided, each dispenser having its own electromechanical switch and emitter. In that embodiment, each emitter emits a uniquely identifiable radio frequency signal so that the emitter, and therefore the associated dispenser, may be identified. A single receiver may wirelessly receive the emitted signals from each of the dispensers and transmit data relating to each of the dispensers to a central computer or server, either directly or via a relay station.

The receiver may send data to the central computer or server only upon fulfillment of one or more predetermined conditions. For example, the receiver may send data to the central computer or server only at certain times of the day. Additionally, or alternatively, the receiver may send data to the central computer or server only when the dispenser has been used to dispense hygiene products a predetermined number of times. This predetermined number may correspond, for example, to the number of times the dispenser may be used before the level of consumables in the dispenser becomes critically low.

In this manner, the receiver minimizes the amount of data transmitted to the central computer or server. This may be desirable where a plurality of electromechanical switches is provided in a washroom, especially where the building includes several washrooms to be monitored. By ensuring that the receiver transmits data to the central computer or server only upon the fulfillment of one or more predetermined conditions, the amount of data transmitted can be minimized, thereby reducing the risk of errors that may occur during data transmission and reducing the costs associated with the transmission of the data and reducing the computer infrastructure and data storage required.

Additionally, or alternatively, electromechanical switches and cooperating emitters to which they are operatively coupled may be provided in other areas of the washroom, such as, for example, on or adjacent to the door to the washroom or on or adjacent to individual cubicle or stall doors. Such electromechanical switches and cooperating emitters to which they are operatively coupled may then operate as traffic sensors which monitor the number of visitors to the washroom or to a particular cubicle. These electromechanical switches and cooperating emitters may be similar to those provided in the dispensers and may be configured to emit a signal when a door is opened or closed, for example. The action of opening or closing the door may cause the electromechanical switches to convert the mechanical energy associated with the opening or closing action into electrical energy, that electrical energy being used by the cooperating emitter to emit a signal each time the door is opened and/or closed. The emitters may emit a uniquely identifiable signal, which may be an RF signal, for example. The emitters may wirelessly communicate with a receiver, such as one that receives emitted signals from other emitters associated with other dispensers, for example, and the receiver may then send data associated with those signals to a central computer or server.

The information received from the emitters associated with a washroom or cubicle door may then be used to determine how many visitors have used the washroom or cubicle during a particular time period. This, in turn, may assist in deciding whether the washroom needs to be cleaned at a particular time or not, and/or whether consumables in the washroom or cubicle may need to be replaced. The data received from all the emitters in a washroom may be sent by the receiver to the central computer or server at the same time, thereby resulting in a decrease in data communication and consequently a decrease in cost.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

FIG. 7 is an enlarged schematic side view of a portion of the dispensing mechanism of the soap dispenser of FIG. 5.

FIG. 8 is an enlarged rear view of the portion of the dispensing mechanism of FIG. 7.

FIG. 9 is a view like FIG. 7, showing soap being dispensed.

FIG. 10 is a schematic side view of the interior of a paper dispenser in accordance with another embodiment of the invention.

FIG. 11 is a side view of a portion of the interior of the paper dispenser of FIG. 10, showing an electromechanical switch of that paper dispenser.

FIG. 12 is a view like FIG. 11, showing the electromechanical switch being activated.

FIG. 13 is a schematic front view of the portion of the interior of the paper dispenser shown in FIG. 11.

FIG. 14 is a schematic view like FIG. 13, showing the electromechanical switch being activated.

FIG. 15 is a schematic side view of a portion of the interior of the paper dispenser of FIG. 10, showing an electromechanical switch.

FIG. 16 is a view like FIG. 15 showing the electromechanical switch being activated.

DETAILED DESCRIPTION

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to accompanying drawings and specific implementations.

Figure 1:
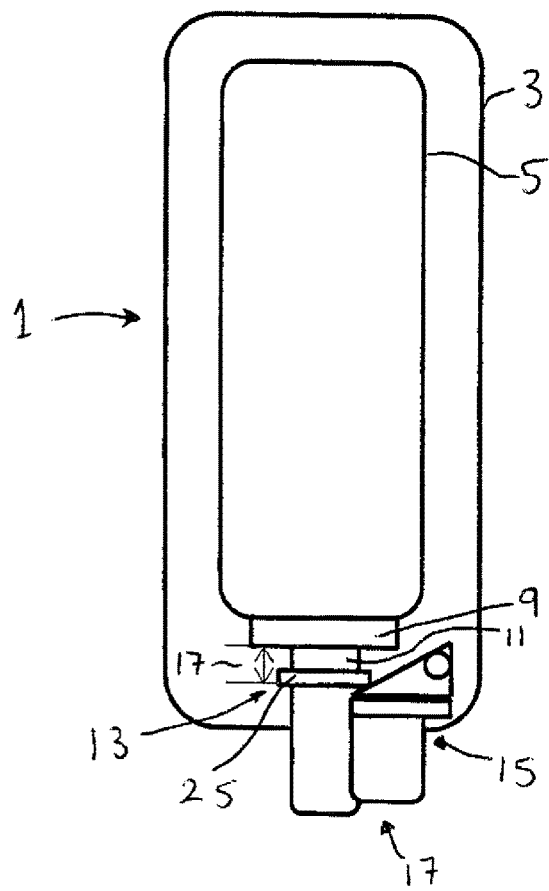
FIG. 1 is a schematic side view of the interior of a soap dispenser in accordance with an embodiment of the invention.

A soap dispenser 1 is shown in FIG. 1. The soap dispenser 1 is a mechanically operated soap dispenser that relies on an input force from a user to dispense soap. The soap dispenser 1 includes a housing 3, a container 5 disposed within the housing for storing liquid soap, and a dispensing mechanism 7. The container 5 includes a neck 9 and a tube 11 through which the soap flows out of the container 5. The dispensing mechanism 7 includes a pump mechanism 13 and a pump actuator 15. When soap is not being dispensed, the pump actuator 15 is in the position shown in FIG. 1, and there is a gap 17 between the pump mechanism 13 and the neck 9 of the container 5.

Figure 4:
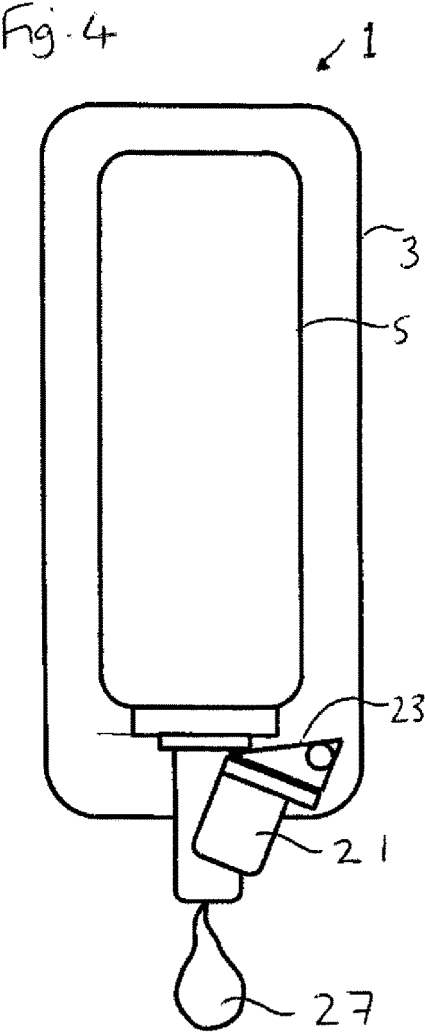
FIG. 4 is a side view of the interior of the soap dispenser of FIG. 1 as soap is being dispensed.
Figure 2:
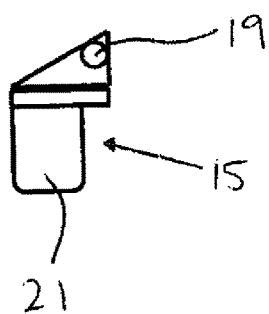
FIG. 2 is a side view of a portion of a dispensing mechanism of the dispenser of FIG. 1.
Figure 3:
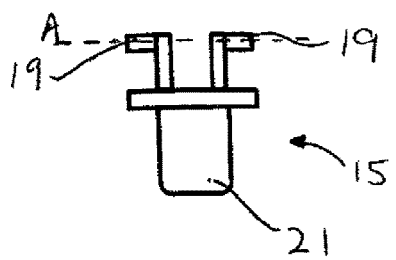
FIG. 3 is a front view of the portion of the dispensing mechanism of FIG. 2.

FIGS. 2 and 3 show the pump actuator 15 in further detail. The pump actuator 15 is configured to rotate around an axis A passing longitudinally through the centre of a pair of arms 19 when a push lever 21 of dispenser 1 is actuated by a user. FIG. 4 shows the soap dispenser 1 when soap is being dispensed. When a user pushes the push lever 21, the pump actuator 15 rotates about the axis A in a rearward direction. This causes a surface 23 of the pump actuator 15 to push the pump mechanism 13 in a linear upward direction, thereby reducing the gap 17 until the collar 25 of the pump mechanism 13 contacts the neck 9 of the container 5 and can move upwardly no further. The dispensing mechanism 7 is thereby activated, and soap 27 is dispensed.

Figure 5:
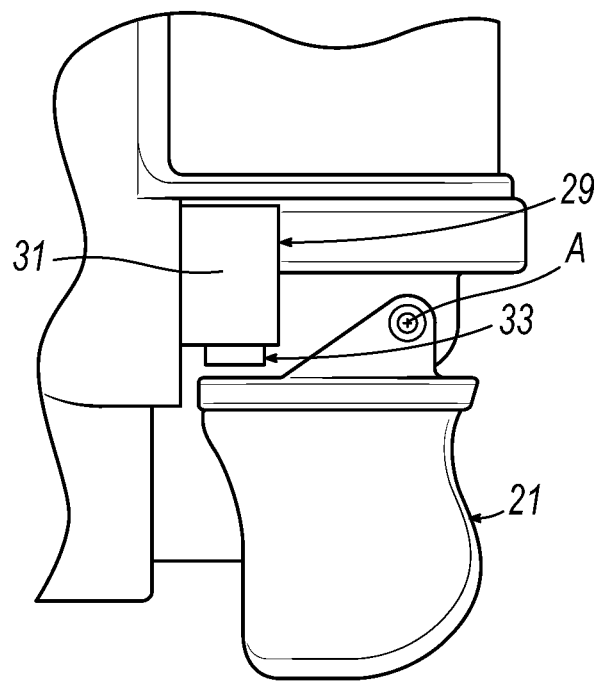
FIG. 5 is a cut away side view of the interior of the soap dispenser of FIGS. 1-4.

With reference to FIG. 5, dispenser 1 includes an electromechanical switch 29. The electromechanical switch 29 is shown in further detail in FIGS. 17 and 18. The electromechanical switch 29 has a housing 31 and a push button 33 which is configured to move in a linear direction into the housing 31 when a force is exerted on that button 33. When the push button 33 is actuated, the dispenser 1 is configured to emit a signal. As can be seen in FIG. 5, the electromechanical switch 29 is located within the housing 3 of the dispenser 1 such that the push button 33 of the electromechanical switch 29 is adjacent the pump actuator 15 and is subject to a force F acting to push the push button 33 towards and at least partially into the housing 31 of the electromechanical switch when a user operates the push lever 21 of the dispenser 1 to obtain soap.

Figure 6:
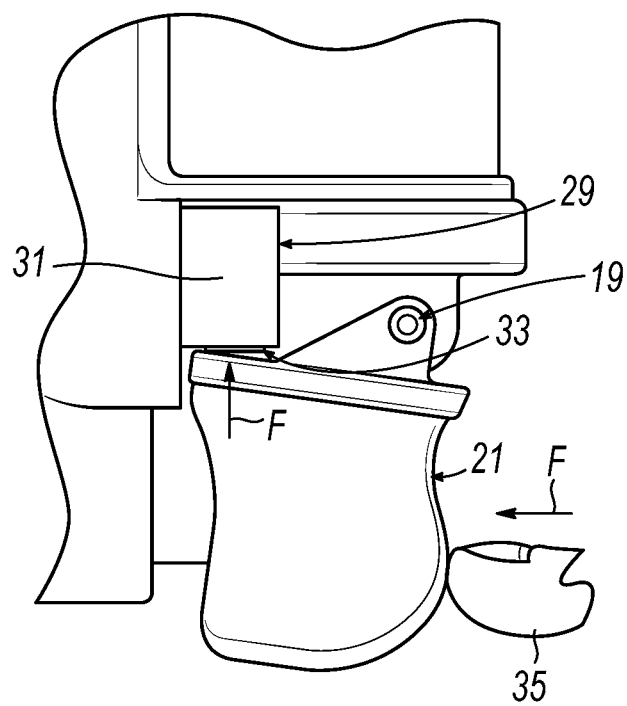
FIG. 6 is a view like that of FIG. 5, showing soap being dispensed.

FIG. 6 shows the dispenser of FIG. 5 when a user 35 pushes the push lever 21 of the dispenser 1. As explained above, the pump actuator 15 rotates in a rearward direction about axis A, thereby activating the pump mechanism 13 and simultaneously imparting a force F to the push button 33 of the electromechanical switch 29. This causes the dispenser to emit a signal each time that a user pushes the push lever 21 of the soap dispenser to obtain soap. Insofar as the soap dispenser ejects approximately the same amount of soap each time the push lever 21 is operated, it is possible to calculate the amount of soap used or the amount of soap remaining in the container 5 from the data regarding the number of times the push lever 21 has been operated since the dispenser was last refilled.

Referring now to FIGS. 7, 8 and 9, the electromechanical switch 29 is mounted in the housing 3 of the dispenser 1. As can be seen in FIG. 9, when a user exerts a force U onto the push lever 21 of the dispenser, the pump actuator 15 rotates as shown by the arrow B. The electromechanical switch 29 is fixedly mounted in the interior of the dispenser 1 such that, when the pump actuator 15 applies a force F to the electromechanical switch 29, the electromechanical switch itself does not move with respect to the dispenser housing 3. Instead, the push button 33 of the electromechanical switch is pushed at least partially into the housing 31 of the electromechanical switch 29, thereby activating the electromechanical switch and causing a signal to be emitted by an emitter that is operatively coupled to that electromechanical switch.

An example of another type of dispenser in accordance with another embodiment of the present invention will now be described. FIG. 10 shows a side view of the interior of a paper dispenser 45. The paper 37 is in the form of a roll 39. The dispenser 45 has a housing 49 with an opening 47 formed therein for the paper 37 to exit the dispenser 45. The paper dispenser 45 is a mechanically operated dispenser. When a user pulls on an end 38 of the paper protruding from the dispenser, paper 37 is unwound from the roll 39 and guided, via rollers 41 and 43, towards the paper exit 47 of the dispenser 45. A cutter (not shown) may be provided near the opening 47 to cut or perforate predetermined lengths of paper to prevent a user from pulling an excessive amount of paper out of the dispenser. The predetermined length of paper may be, for example, the circumferential length of the roller 43. The dispenser 45 is configured, in a known manner, to try to ensure that some paper 37 protrudes from the exit 47 of the dispenser 45 after a user has pulled paper out of the dispenser. However, it is possible that the end 38 of the paper remains in the dispenser 45 and, to facilitate the dispensing of the paper in such circumstances, a paper feeding lever 51 is provided. A user is then able to manually operate the paper feeding lever 51 in order to obtain paper from the dispenser 45.

In order to gauge the amount of paper used or left on the roll in the dispenser, an electromechanical switch 29 may be used, in a similar manner as for the previous example of a soap dispenser. FIG. 11 shows a side view of the roller 43 around which paper 37 is guided to the opening 47. The electromechanical switch 29 is fixedly mounted in the interior of the dispenser, for example on an interior surface of the housing 49 of the dispenser 45, as can be seen in the front view of part of the dispenser as depicted in FIG. 13. Both FIGS. 11 and 13 show the electromechanical switch 29 in an inactivated state. As can be seen in FIG. 13, a rotatable shaft 53 is rotatably fixed to the housing 49 and the roller 43 is supported on and is rotatable with the shaft 53. An engaging part 55 is also mounted on the rotatable shaft 53 and is rotatable with the shaft 53. When a user pulls the end 38 of the paper 37, the roller 43 starts to rotate in the direction of the arrow R and paper 37 is pulled from the roll 39 and is dispensed through the opening 47. Rotation of the roller 43 causes the shaft 53 to also rotate, and the engaging part 55 rotates with the shaft 53. The electromechanical switch 29 is mounted at a location within the dispenser that allows the engaging part 55 to contact and to impart a force F to the push button 33 of the electromechanical switch 29 every time the engaging part 55 (and therefore the rotating shaft and the roller 43) completes a full rotation.

During rotation of the roller 43, the electromechanical switch 29 remains in an inactivated state until the engaging part 55 activates the electromechanical switch 29 by importing a force F to the push button 33, as can be seen in FIGS. 12 and 14. The push button 33 and/or the engaging part 55 may be shaped to facilitate contact between these parts whilst reducing friction, so that the rotation of the roller is not impaired by the electromechanical switch 29. Once per complete rotation, it can be seen that the engaging part 55 contacts and exerts a force on the push button 33 of the electromechanical switch 29 to cause the push button 33 to retract into the housing 31 of the electromechanical switch 29, as shown in FIGS. 12 and 14. The engaging part 55 then continues to rotate in the direction shown by arrow R. Once the engaging part 55 ceases to contact the electromechanical switch 29, there is no longer a force F exerted on the push button 33, and the push button 33 returns to its original position. In this manner, the electromechanical switch 29 is activated each time the roller 43 completes a rotation. The amount of paper dispensed can be calculated by knowing the circumferential length of the roller and the number of rotations completed by the roller, as indicated by the electromechanical switch 29.

As explained above, the paper dispenser 45 in the illustrated embodiment has a paper feeding lever 51 to enable paper to be dispensed in situations in which the end 38 of the paper 37 remains in the housing of the dispenser rather than protruding outwardly from housing 49. It is also known that some dispensers are not configured to operate due to a user pulling the end 38 of the paper 37, but instead are configured to operate by the user operating a paper feeding lever 51 to cause the roller 43 to rotate and thereby dispense a predetermined length of paper. For such dispensers, an electromechanical switch 29 may be installed in or on a surface of the housing 49 of the dispenser 45, as shown in FIG. 15. When a user operates the paper feeding lever 51 by applying a force M to the lever 51 (FIG. 15), the lever 51 rotates as shown in FIG. 16, causing the roller 43 to rotate in the direction indicated by the arrow R, which in turn results in paper being dispensed. As the lever 51 rotates, it contacts and exerts a force on the push button 33 of the electromechanical switch, causing the push button 33 to retract into the housing 31 of the electromechanical switch and thereby activating the electromechanical switch 29. Again, by knowing the length of paper dispensed each time the paper feeding lever 51 is activated and the number of times the paper feeding lever 51 is activated, as indicated by the electromechanical switch 29, the amount of paper dispensed can be calculated.

An electromechanical switch 29 may form part of other types of dispensers, such as paper tissue dispensers and toilet paper dispensers, for example, in a manner similar to the above examples. Furthermore, an electromechanical switch 29 may form part of dispensers that are configured to dispense paper provided in a stack, rather than on a roll, and generally form part of any type of dispenser that includes at least one component that moves in connection with dispensing of a consumable. The dispensers may be purely mechanically operable by a user, such as the soap dispenser and paper dispensers as described above. Alternatively, the dispensers may be electrically operated by an electrical signal which causes the dispenser to operate when a certain condition is fulfilled, such as detection of an approaching object e.g., a hand. In embodiments that utilize electrical energy for dispensing a consumable, a moving component that is activated by the electrical signal may be used to activate an electromechanical switch 29 in the manner described above. The present disclosure is therefore not limited to any particular type of dispenser or type of consumable and is not limited to purely mechanically-operated dispensers.

Figure 17:
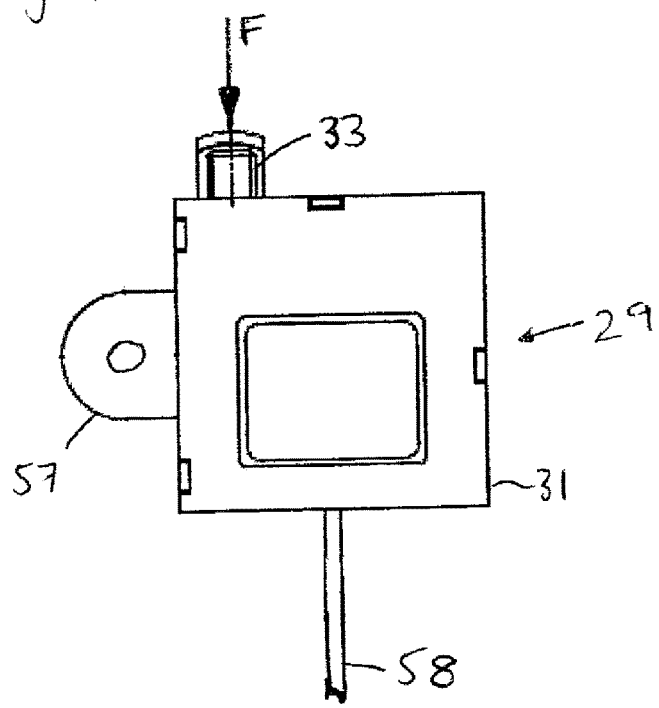
FIG. 17 is a front view of an example of an electromechanical switch suitable for use in embodiments of the present invention.

An example of an electromechanical switch 29 suitable for use in the various embodiments of the invention as described above is described with reference to FIGS. 17 and 18. FIG. 17 shows the exterior of an electromechanical switch 29 having a housing 31 and a push button 33, the push button 33 being actuated by a force F that causes the push button 33 to retract into the housing 31. The electromechanical switch 29 has a mounting plate 57 for mounting same in the interior or exterior of a housing of a dispenser. When the push button 33 is subject to a predetermined force F, the electromechanical switch 29 converts the mechanical energy associated with depression of the push button 33 into electrical energy, and the electrical energy generated is used by the dispenser to emit a signal. The interior of the electromechanical switch 29 is shown in FIG. 18.

Figure 18:
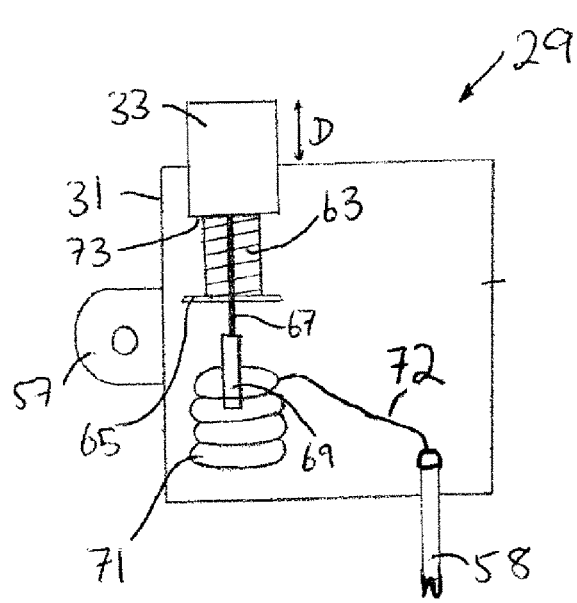
FIG. 18 is a schematic view of an interior of the electromechanical switch of FIG. 17.

As can be seen in FIG. 18, in this example the push button 33 is biased outwardly by a spring 63 to cause it to protrude a predetermined distance D from the housing 31 when the push button 33 is not depressed. The spring 63 is positioned between the push button 33 and a fixed plate 65 that is fixed with respect to the housing 31. A connection rod 67 extends from the lower part 73 of the push button 33, through or around the fixed plate 65, to a magnet 69, and mechanically connects the push button 33 to the magnet 69. A coil 71 is fixed adjacent to or at least partially around the magnet 69 and is operatively coupled to a conductive path defined by a wire 72. The wire 72 is connected to or forms part of a cable 58 that extends outwardly from the housing 31. Current generated by the electromechanical switch 29 can be provided to other parts of the dispenser through cable 58.

Figure 19:
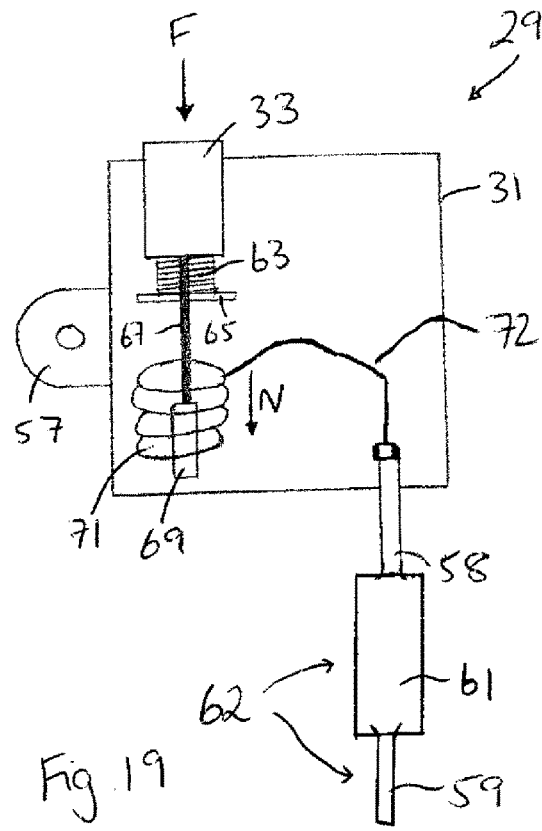
FIG. 19 is a view like FIG. 18 showing the electromechanical switch being activated.

As shown in FIG. 19, when the push button 33 is depressed, it retracts at least partially into the housing 31. The connection rod 67 is sufficiently rigid such that, when a force F is applied to the push button 33 causing the push button to retract, the magnet 69 is moved a corresponding distance by the connection rod 67 in the direction indicated by arrow N. This causes the magnet 69 to pass through at least a portion of the coil 71, thereby generating a current in the coil 71. Current flows from the electromechanical switch via the conductive path defined by wire 72 and cable 58 to an emitter 62, such as an RF emitter, which is configured to produce and emit a signal, such as an RF signal, in response to receiving electrical power. The emitter 62 includes a circuit board 61 configured to produce a signal, for example an RF signal, in response to receiving electrical power. The emitter 62 further includes an antenna 59.

The circuit board 61 and antenna 59 may be provided at the same location within or on the dispenser or may alternatively be provided at different locations. The emitter 62 may be located adjacent the electromechanical switch 29 of the dispenser or may alternatively be provided at another location in the interior or exterior of the dispenser. If desired, the cable 58 may be replaced with a socket or connector to enable electrical coupling between the electromechanical switch 29 and a connector or socket of the emitter. In any case, the emitter in the illustrated embodiment is electrically coupled to the electromechanical switch 29.

When the force F is removed from the push button 33, the biasing action of the spring 63 causes the push button to return to its original position, as shown in FIG. 18. Due to the mechanical connection between the push button 33 and the magnet 69, the magnet 69 also moves back to its original position. As the magnet 69 moves, it passes back through the coil 71, thereby causing a current to flow in the coil 71. This current flows to the emitter 62 via the conductive path defined by wire 72, and the circuit board 61 produces an RF signal that is then emitted via antenna 59 as explained above.

In the illustrated embodiment an RF signal is emitted each time the push button 33 is depressed, and also each time the push button 33 is released. Accordingly, in this embodiment, two signals are emitted each time a user operates the dispenser. One signal (such as 0) is emitted when the push button 33 is actuated, and an additional signal (such as 1) is emitted when the push button 33 is released. For example, in the soap dispenser described above, the electromechanical switch 29 emits a signal (such as 0) each time a user presses the push lever 21 to obtain soap and another signal (such as 1) each time the user releases the push lever 21. In calculating the amount of soap used, it must be considered that, in that embodiment, each squirt of soap generates two signals. It is also of note that a receiver or central computer or server may identify whether the signal is one emitted upon actuation (i.e., depression) of the push button (such as 0) or whether the signal is one emitted upon release of the push button (such as 1), for example.

Other designs of electromechanical switches which use a mechanical input F to generate their own power are alternatively contemplated. For example, an electromechanical switch may include a piezoelectric element that responds to a force F exerted on that element in connection with dispensing of a consumable.

Examples of electromechanical switches that utilize relative motion between a coil and magnet to generate power may be obtained, for example and without limitation, from Cherry/ZF Friedrichshafen Electronic Systems of Germany, and identified as model numbers AFIS 1002, AFIS 1003, AFIS 5002, and AFIS 5003. Each of these example electromechanical switches has an integral RF emitter i.e., each includes an emitter that is at least partially disposed within the housing of those electromechanical switches.

Figure 20:
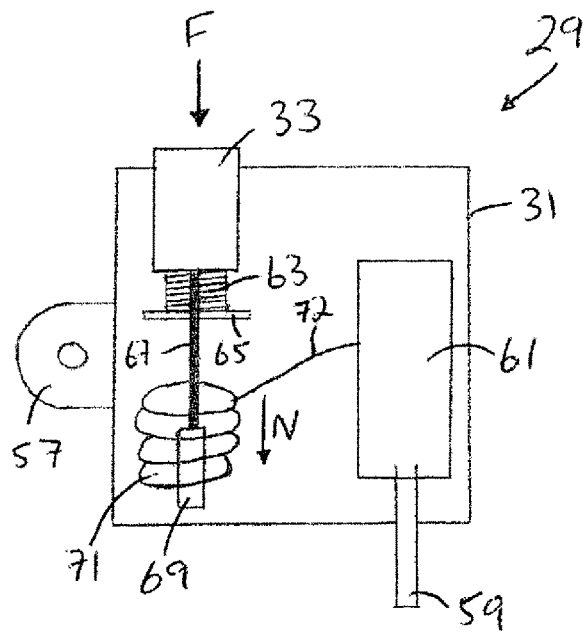
FIG. 20 is a schematic view of an electromechanical switch having an emitter integrated with the electromechanical switch into a common housing.

An example of a device that includes an electromechanical switch and an integral RF emitter can be seen in FIG. 20. In this figure, the electromechanical switch 29 has a housing 31 that includes an emitter in its interior. The emitter includes a circuit board 61 which is connected to the electromechanical switch 29 via the conductive path defined by wire 72, and an antenna 59 that is electrically connected to the circuit board 61. The antenna 59 extends outwardly from an interior of the housing 31.

Embodiments are contemplated of systems that include a plurality of electromechanical switches and a corresponding plurality of emitters. More specifically, systems are contemplated made up of a plurality of dispensers, with each of those dispensers having an electromechanical switch operatively coupled with an emitter that may or may not be integral with the corresponding electromechanical switch. In those embodiments, the circuit board 61 of each emitter may be configured to emit a unique RF signal so that the signals emanating from each of the different electromechanical switches may be readily identified.

Figure 21:
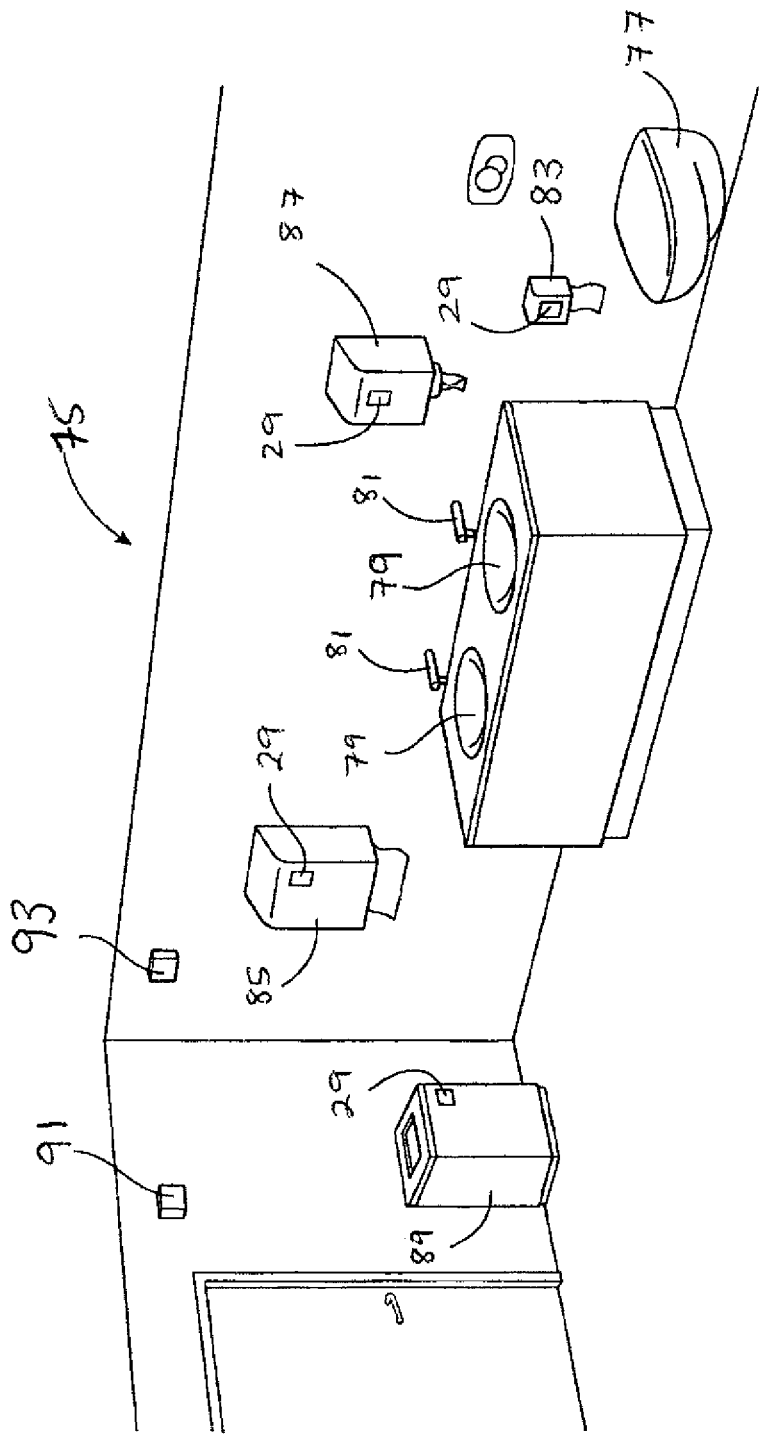
FIG. 21 is a schematic perspective view of a washroom including dispensers in accordance with embodiments of the present invention.

FIG. 21 shows a washroom 75 in which a system as described above can be used. In this example, the washroom 75 includes a toilet 77, several sinks 79 and several water taps 81, each sink 79 having a corresponding tap 81. The washroom 75 includes various dispensers: A toilet paper dispenser 83 is positioned close to the toilet, and a paper towel dispenser 85 and a soap dispenser 87 are positioned near the sinks. In this example, only one of each type of dispenser is provided, but for a larger washroom, several dispensers of the same type, e.g. soap dispensers, may be provided. A waste bin 89 is also provided in the washroom. Each of the dispensers 83, 85, 87 as well as the bin 89 is provided with an electromechanical switch 29. Each of the electromechanical switches 29 is configured to detect the remaining amount of a consumable, such as soap or paper towel, for example, in each dispenser. The waste bin 89 may also be provided with an electromechanical switch 29 for detecting the amount of waste placed in the waste bin.

The washroom 75 may optionally also include a sensor 91 for detecting the number of persons entering the washroom 75. The sensor 91 may be positioned on a wall or at a door entrance, as shown in FIG. 20. The sensor 91 may, for example and without limitation, include a light emitting diode that cooperates with a photodetector. Alternatively, sensor 91 may use another known technology for detecting the presence and/or number of persons entering the washroom. The sensor 91 may for example be a trigger sensor triggered by the opening of the door to the washroom or may be a motion sensor triggered by the movement of a visitor within the washroom, for example. In this example, the sensor 91 includes an electromechanical switch 29 of the type described above in connection with the various embodiments described in the present disclosure. In that regard, the electromechanical switch 29 of sensor 91 is activated by the mechanical action of opening the door to the washroom 75. While not shown, an emitter also forms part of sensor 91 and cooperates with the electromechanical switch 29 to emit a signal in a manner like that associated with the other embodiments described herein.

The example system illustrated in FIG. 21 also includes a remotely located receiver 93 for wirelessly receiving the signal emitted by emitters coupled to each of the electromechanical switches 29. The receiver may be positioned in or outside of the washroom, provided that the distance between the receiver 93 and each of the emitters is suitably chosen so as to maintain wireless communication between the receiver 93 and each of those emitters. The receiver 93 may be located on a wall or ceiling within or outside of the washroom 75, or may be located within one of the dispensers, for example. The receiver 93 receives a signal from an emitter of a dispenser whenever that dispenser is used, as explained above. Each emitter is configured to emit a unique RF signal, so that the receiver 93 can be paired with each of the emitters when the system is set up in the washroom, and the receiver 93 can then identify which emitter emits a particular signal. It is contemplated that the electromechanical switches 29 and corresponding emitters described in connection with the embodiment of FIG. 25 may be of the type in which the electromechanical switch and emitter in each dispenser are separate units, adjacent or not from another. It is similarly contemplated that they may instead be integral with one another, in a common housing, as in the non-limiting example shown in FIG. 20.

Figure 22:
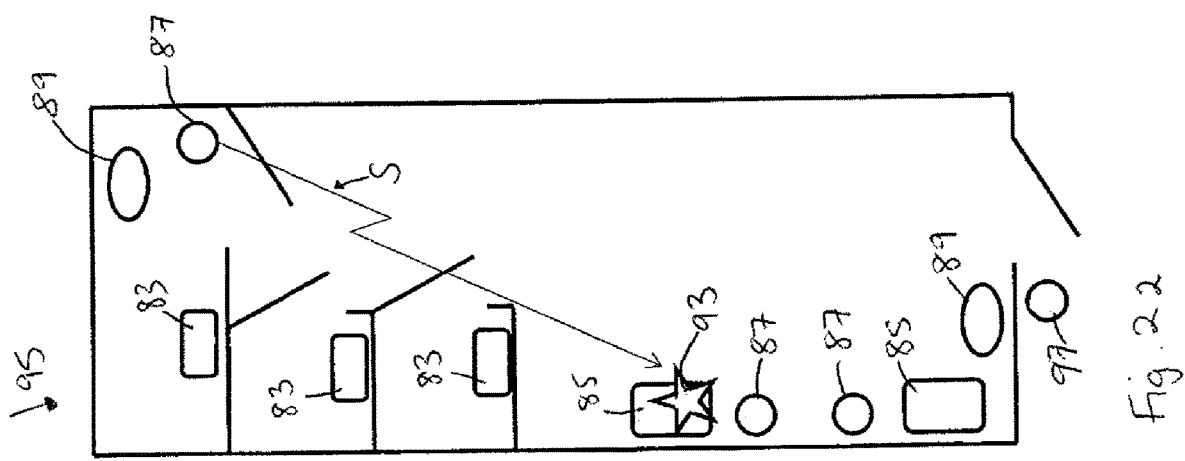
FIG. 22 is a schematic plan view of a washroom incorporating a system for monitoring the consumption of hygiene products in one or more dispensers, in accordance with embodiments of the present invention.

FIG. 22 shows a schematic diagram of another washroom 95. The washroom 95 includes several toilet cubicles or stalls, each having a toilet paper dispenser 83. There are also several soap dispensers 87 and two paper towel dispensers 85. Each dispenser includes an electromechanical switch 29 and an emitter. The washroom 95 also has two waste bins 89, each waste bin including an electromechanical switch 29 and an emitter. Located outside the washroom 95 is a hand sanitizer dispenser 97 which also includes an electromechanical switch 29 and an emitter. In this example, the receiver 93 is located within a paper towel dispenser 85. Alternatively, the receiver 93 could be located on the wall or ceiling of the washroom, or outside of the washroom.

Each time that a dispenser is used by a visitor to the washroom, that dispenser emits an RF signal S unique to that dispenser, the signal S being received by the receiver. The receiver can then identify which dispenser has been used. Once a predetermined number of signals, corresponding to a particular amount of consumable used, have been emitted by a particular dispenser, the receiver may relay this information to a central computer or server. The central computer or server may then indicate to a janitor that a particular dispenser needs to be refilled. In the case of a waste bin 89, the emitter of that waste bin 89 may emit a signal each time that the lid of the waste bin 89 is operated, for example. Once the emitter of the waste bin has emitted a predetermined number of signals, corresponding to an expected amount of waste thrown into the waste bin, the receiver may relay this information to a central computer or server. The central computer or server may then indicate to a janitor that a particular waste bin needs to be emptied.

Figure 23:
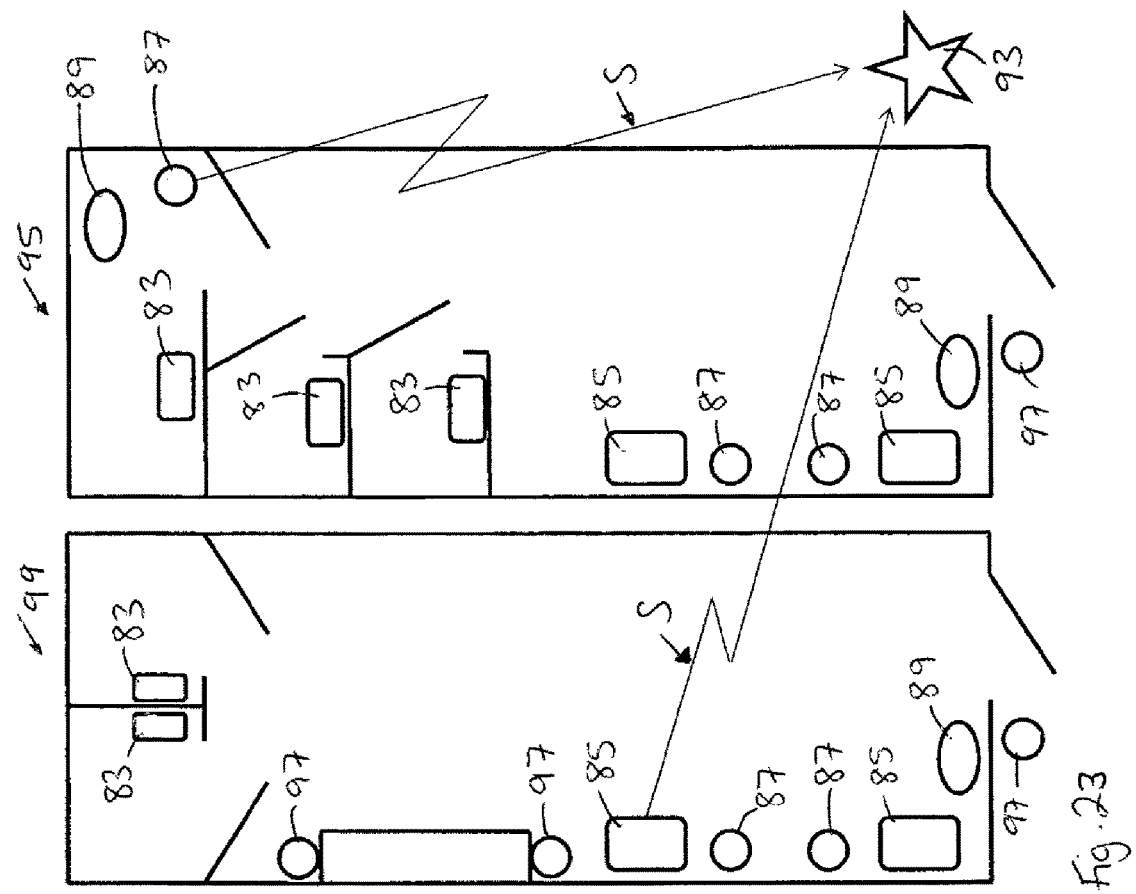
FIG. 23 is a schematic plan view of a plurality of washrooms incorporating a system for monitoring the consumption of hygiene products in one or more dispensers, in accordance with embodiments of the present invention.

FIG. 23 shows two washrooms 95, 99 located adjacent each other. The washroom 95 is as described with respect to FIG. 22, except that the receiver 93 is not located within a paper towel dispenser in the washroom 95. Instead, in this example the receiver 93 is located outside of both washrooms, for example in a corridor between the washrooms. The washrooms 95 and 99 may be, for example, ladies' and men's washrooms respectively. Each of the dispensers in the washrooms of this example includes an electromechanical switch 29 and an emitter, each emitter being configured to emit a unique RF signal. During use of the washrooms, each time that a dispenser is used, the emitter associated with that dispenser emits a signal S which is received by the receiver 93. For example, as shown in FIG. 23 at a particular point in time a paper towel dispenser 85 in one washroom 99 is being used and also a soap dispenser 87 in the other washroom 95 is being used. Each of the emitters of the dispensers 85, 87 emits a signal S, and the receiver 93 receives these signals and identifies the dispensers from the signals.

The receiver 93 may be configured to transmit this information immediately to a central computer or server. Alternatively, the receiver 93 may be configured to store this information and only transmit information pertaining to one or more dispensers at a particular time, e.g. once per day, or on completion of a particular event, e.g. when a particular dispenser has emitted a predetermined number of signals.

By ensuring that the receiver 93 is configured to store information and to transmit this information or a simplified version of this information to a central computer or server intermittently rather than continuously, the amount of data transmitted may be minimized, thereby saving on cost and infrastructure and promoting efficiency and data transfer reliability.

The receiver 93 may transmit the information wirelessly and may be powered by a battery. The receiver may be configured to transmit an alert signal to a mobile telecommunications device, such as a mobile phone, a tablet, or a laptop, when it has received a predetermined number of signals from a particular dispenser so that a cleaner or janitor can be informed that the dispenser requires refilling. The alert signal may be sent via a text message, an email, an automated voice call or an alert on a webpage that the mobile device is connected to, for example. The alert can also be displayed on a graphical user interface of a computer used by a janitor or cleaner.

The data transmitted by the receiver 93 to a central computer or server may be used by management in order to calculate when consumables need to be ordered and how many consumables are required. The data may also be used, for example, to ascertain when the washroom is busy so that extra cleaning can take place at peak times.

Figure 24:
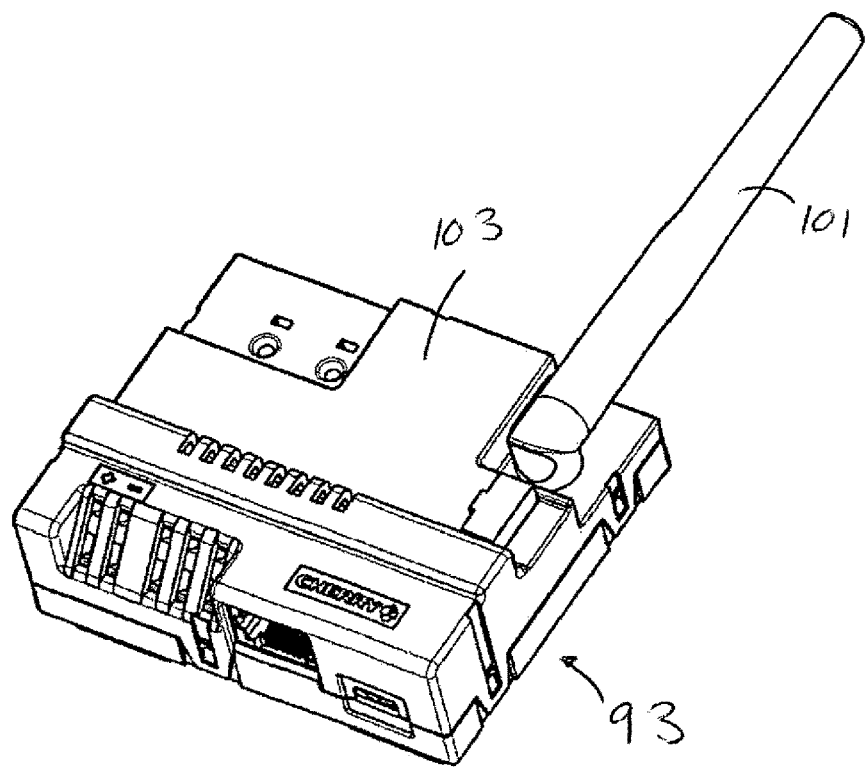
FIG. 24 is an isometric view of a receiver for use in a system for monitoring the consumption of hygiene products in one or more dispensers, in accordance with embodiments of the present invention.

FIG. 24 shows an example receiver 93 suitable for use in cooperation with the electromechanical switches 29. The receiver 93 has a housing 103 and an antenna 101 that extends from the housing 103. The receiver includes an RF circuit board with electronic components for receipt and storage of RF signals, and a power supply circuit board including a power source such as a battery, for example.

The functionality of the electromechanical switches and cooperating emitters described above may be selectively activated in a dispenser for a short time, for example to permit management to more accurately predict the amount of consumables to order for a given period, or may be remain in an activated status in a dispenser long-term, for example to alert a janitor when a particular dispenser needs to be refilled. Deactivating of that functionality may, for example, take the form of disconnecting or otherwise decoupling an electromechanical switch from a corresponding emitter.

A second electromechanical switch 29 and cooperating emitter may be installed in a dispenser to send a signal to the receiver when the closing or locking mechanism which is opened when refilling the dispenser has been opened and/or closed. For example, an electromechanical switch may be installed in or on a dispenser adjacent to a door or hatch which is opened during refilling of the dispenser. When the door is closed, the push button of the electromechanical switch may be depressed by the door. When the door is opened, the push button may be released and a signal (such as a 0) emitted by the dispenser accordingly. Once the dispenser has been refilled, the door is closed, thereby activating the push button and causing an additional signal (such as a 1) to be emitted by an emitter of the dispenser. The signals may be time stamped by the receiver. The system may then be used to ascertain whether a dispenser has been refilled or not, when the dispenser was refilled and whether the door or hatch was properly closed after refilling of the dispenser. Where a signal corresponding to opening of the door or hatch in the dispenser is received, and no signal corresponding to the closing of the door or hatch is received after a predetermined time, an alert may be sent to the janitor or to a manager to indicate that the door or hatch of the dispenser has not been properly closed. Dispensers may be configured to include a snap fit or some other type of releasable coupling for the electromechanical switch and emitter, so that an electromechanical switch and emitter may be fitted at any time into a housing or other component of a dispenser and may be removed and/or replaced as required. This may be further facilitated by using an electromechanical switch that is paired with an integral emitter, as in the example embodiment of FIG. 20.

While the foregoing description and drawings represent exemplary embodiments of the present invention, it will be understood that various additions, modifications and substitutions may be made therein without departing from the spirit and scope of the present invention. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A dispenser for hygiene products, comprising:
an electromechanical switch which is configured to operate when a hygiene product is dispensed, wherein an action of dispensing the hygiene product causes the electromechanical switch to convert a mechanical energy associated with the dispensing action into electrical energy, and
a signal emitter operatively coupled to the electromechanical switch and configured to use that electrical energy to emit two signals each time a hygiene product is dispensed,
wherein the two signals includes a first signal and a second signal different from the first signal, the first and second signals emitted from the signal emitter to be received by a receiver positioned remotely from the dispenser,
wherein the signal emitter emits the first signal when a push button of the electromechanical switch is actuated and emits the second signal when the push button of the electromechanical switch is released,
wherein the receiver determines the push button is depressed based on the first signal and determines an amount of hygiene product is dispensed based on the first signal, determines the push button is released based on the second signal and determines no hygiene product is dispensed based on the second signal, and calculates an amount of the hygiene product remaining based on distinguishing the first signal indicating the push button is depressed and from the second signal indicating the push button is released.

2. The dispenser of claim 1, wherein the electromechanical switch includes a coil and a magnet.

3. The dispenser of claim 2, wherein the dispenser is configured such that, when the hygiene product is dispensed, the action of dispensing causes the magnet to be physically moved relative to the coil to thereby generate an electric current which is used to transmit the two signals.

4. The dispenser of claim 1, wherein the dispenser comprises a circuit board and antenna for generating and emitting a radio frequency signal.

5. A system for monitoring the consumption of hygiene products in a dispenser, the system comprising:
the dispenser of claim 1;
the receiver of claim 1; and
a central computer or server for receiving data from the receiver.

6. The system of claim 5, wherein the system further includes an electromechanical switch that is activated by the action of opening a door to a washroom, cubicle or stall, and a signal emitter configured to emit a uniquely identifiable signal each time said door is opened and/or closed.

7. The system of claim 5, wherein a plurality of the dispensers is provided, each dispenser comprising an electromechanical switch and a signal emitter, and wherein each signal emitter is configured to emit a uniquely identifiable radio frequency signal so that the emitter, and therefore the associated dispenser, may be identified.

8. The system of claim 5, wherein the central computer or server is associated with a storage medium for storing and/or monitoring data received from the receiver.

9. The system of claim 5, wherein the receiver is configured to send data to the central computer or server only upon fulfilment of one or more predetermined conditions.

10. The system of claim 9, wherein the receiver is configured to send data to the central computer or server only when the dispenser has been used to dispense hygiene products a predetermined number of times.

11. A method of monitoring a dispenser for hygiene products, the method comprising:
providing a dispenser that has an electromechanical switch that operates when a hygiene product is dispensed, an action of dispensing the hygiene product causing the electromechanical switch to convert a mechanical energy associated with the dispensing action into electrical energy, the dispenser further being provided with an emitter that uses that electrical energy to emit two signals each time a hygiene product is dispensed, the two signals including a first signal and a second signal different from the first signal; and providing a receiver which wirelessly receives the two signals emitted by the emitter, the receiver being positioned remotely from the dispenser and the receiver transmitting data related to the dispenser to a central computer or server, wherein the emitter emits the first signal when a push button of the electromechanical switch is actuated and emits the second signal when the push button of the electromechanical switch is released, wherein the receiver determines the push button is depressed based on the first signal and determines an amount of hygiene product is dispensed based on the first signal, determines the push button is released based on the second signal and determines no hygiene product is dispensed based on the second signal, and calculates an amount of the hygiene product remaining based on distinguishing the first signal indicating the push button is depressed from the second signal indicating the push button is released.

12. The method of claim 11, wherein the two signals are different from each other.

13. The method of claim 12, wherein one signal is emitted when a push button of the electromechanical switch is actuated and another signal when the push button is released.

14. The method of claim 11, wherein a plurality of dispensers are provided, each dispenser having an electromechanical switch and an emitter.

15. The method of claim 14, wherein each emitter emits a uniquely identifiable radio frequency signal so that the emitter, and therefore the associated dispenser, may be identified.

16. The method of claim 15, wherein a receiver wirelessly receives the signals from each of the dispensers and transmits data relating to each of the dispensers to a central computer or server, either directly or via a relay station.

17. The method of claim 16, wherein the receiver sends data to the central computer or server only upon fulfilment of one or more predetermined conditions.

18. The system of claim 5, wherein both of the two signals are indicative of a single dispensing action actuation at the dispenser, the signal emitter transmits the two signals to the receiver remote from the dispenser for each single dispensing action, and wherein the receiver or the central computer calculates a total number of dispensing actions performed since a most recent refill of the dispenser based on the signals received from the dispenser, such that counting of the total number of dispensing actions occurs remote from the dispenser based on emitted signals received from the dispenser, and then the receiver or the central computer calculates an amount of remaining hygiene product in the dispenser based on the total number of dispensing actions performed since a most recent refill of the dispenser.

* * * * *